United States Patent
Nitsch

(10) Patent No.: US 8,815,036 B2
(45) Date of Patent: Aug. 26, 2014

(54) METHOD FOR MANUFACTURING A PROFILED PREFORM

(75) Inventor: Christian Nitsch, Lilienthal (DE)

(73) Assignee: Airbus Operations GmbH, Hamburg (DE)

( * ) Notice: Subject to any disclaimer, the term of this patent is extended or adjusted under 35 U.S.C. 154(b) by 650 days.

(21) Appl. No.: 12/919,652

(22) PCT Filed: Feb. 27, 2009

(86) PCT No.: PCT/EP2009/001412
§ 371 (c)(1),
(2), (4) Date: Nov. 3, 2010

(87) PCT Pub. No.: WO2009/106341
PCT Pub. Date: Sep. 3, 2009

(65) Prior Publication Data
US 2011/0048624 A1  Mar. 3, 2011

Related U.S. Application Data

(60) Provisional application No. 61/031,754, filed on Feb. 27, 2008.

(30) Foreign Application Priority Data

Feb. 27, 2008 (DE) .................... 10 2008 011 410

(51) Int. Cl.
*B29C 70/52* (2006.01)
*B29D 99/00* (2010.01)
*B29K 63/00* (2006.01)
*B29L 31/00* (2006.01)

(52) U.S. Cl.
CPC ............ *B29C 70/523* (2013.01); *B29C 70/526* (2013.01); *B29C 70/528* (2013.01); *B29D 99/0003* (2013.01); *B29K 2063/00* (2013.01); *B29L 2031/003* (2013.01)
USPC .............................. 156/201; 156/269; 264/258

(58) Field of Classification Search
None
See application file for complete search history.

(56) References Cited

U.S. PATENT DOCUMENTS 4,561,376 A  12/1985  Fitzgerald-Smith
4,580,959 A   4/1986  Pizzorno et al.
(Continued)

FOREIGN PATENT DOCUMENTS

DE  4017978 A1  12/1991
DE  19754381 A1  6/1999
(Continued)

OTHER PUBLICATIONS

F. C. Campbell, "Manufacturing processes for advanced composites" Elsevier, Oxford, UK, 2004, pp. 300-329.
(Continued)

Primary Examiner — Barbara J Musser
(74) Attorney, Agent, or Firm — Ingrassia Fisher & Lorenz P.C.

(57) ABSTRACT

Pultrusion methods and apparatus for manufacturing a profiled preform or FRP-component with cross-sectional segments that extend angularly to one another from a plurality of semifinished products in a quasi-continuous process, where: at least one multilayer semifinished product arrangement [of a multilayer semifinished product arrangement] is dispensed from a dispenser unit in order to manufacture the preform, with the multilayer semifinished product arrangement dispensed from the dispenser unit being fed to the forming device and including a combination of several webs of semifinished reinforcement fiber layers and at least one resin film; the semifinished product arrangement is guided through a forming device and at least one cross-sectional segment of the semifinished product arrangement is angled in order to form an angle profile, with the semifinished product arrangement being compressed in a pressing device, optionally after a hardening process, and with a longitudinal section of the preform or the component being removed after a cutting process.

22 Claims, 5 Drawing Sheets

(56) References Cited

U.S. PATENT DOCUMENTS

| | | | |
|---|---|---|---|
| 4,911,973 A * | 3/1990 | Dunbar | 428/102 |
| 4,971,543 A | 11/1990 | Minor | |
| 5,043,128 A | 8/1991 | Umeda | |
| 6,096,669 A | 8/2000 | Colegrove et al. | |
| 6,592,795 B2 * | 7/2003 | Kasai et al. | 264/241 |
| 2001/0007684 A1 | 7/2001 | Kasai et al. | |
| 2007/0241478 A1 * | 10/2007 | Buckley | 264/257 |
| 2008/0145634 A1 | 6/2008 | Hillermeier et al. | |
| 2009/0050263 A1 | 2/2009 | Suzuki et al. | |
| 2009/0071593 A1 | 3/2009 | Slaback et al. | |
| 2010/0015405 A1 | 1/2010 | Bechtold et al. | |

FOREIGN PATENT DOCUMENTS

| | | |
|---|---|---|
| DE | 69814129 T2 | 4/2004 |
| DE | 60118048 T2 | 9/2006 |
| EP | 116575 A | 8/1984 |
| EP | 0170109 A2 | 2/1986 |
| EP | 0315770 A2 | 5/1989 |
| EP | 1621323 A1 | 2/2006 |
| EP | 2006074 A1 | 12/2008 |
| JP | 2005324513 A | 11/2005 |
| WO | 2007107007 A1 | 9/2007 |
| WO | 2007119371 A | 10/2007 |
| WO | 2008019894 A | 2/2008 |

OTHER PUBLICATIONS

International Search Report for corresponding PCT Application No. PCT/EP2009/001412, Oct. 6, 2009.

International Preliminary Report on Patentability for corresponding PCT Application No. PCT/EP2009/001412, Sep. 7, 2010.

* cited by examiner

METHOD FOR MANUFACTURING A PROFILED PREFORM

CROSS REFERENCE TO RELATED APPLICATIONS

This application claims priority to PCT Application No. PCT/EP2009/001412, filed Feb. 27, 2009; which claims priority to German Patent Application No. DE 10 2008 011 410.3, filed Feb. 27, 2008, and claims the benefit to U.S. Provisional Patent Application No. 61/031,754, filed Feb. 27, 2008, the entire disclosures of which applications are hereby incorporated by reference.

BACKGROUND

The invention pertains to a method for manufacturing a profiled preform and a profiled FRP-component, a pultrusion system, as well as a pressing device for carrying out the method.

The invention particularly pertains to a pultrusion method for manufacturing a profiled preform with cross-sectional segments that extend angularly to one another from a plurality of semifinished products in a quasi-continuous process, as well as to a pultrusion method for manufacturing a profiled FRP-component with cross-sectional segments that extend angularly to one another from a plurality of semifinished products in a quasi-continuous process.

Furthermore, the invention particularly pertains to a pultrusion system for manufacturing a profiled preform or fiber-reinforced plastic (FRP) component with cross-sectional segments that extend angularly to one another from a plurality of semifinished products, as well as to a pressing device for pressing a semifinished product arrangement with cross-sectional, segments that extend angularly to one another.

From WO 2007/119371 A1 a process for manufacturing a perform, and apparatus therefore is known, wherein a perform with a branched portion in its cross-section profile is continuously manufactured by delivering a raw form of reinforcing fiber base material with a branched portion in its cross-section profile, among multiple reinforcing fiber base materials for constructing the perform, intermittently in the longitudinal direction thereof.

DE 4017978 A1 describes a device for manufacturing profiled parts (profiles PR) from thermoplastic semifinished products with a two-part or multipart moulding press, the parts of which form a heating zone (HZ), a pressing zone (PZ) and a cooling zone (KZ), wherein the shape of the gap formed by the parts of the moulding press continuously changes from the initial profile (rectangular cross section) to the desired profile (PR).

DE 19754381 A1 discloses a method for manufacturing a profiled part, particularly a pultrusion method, in which a plurality of fibers and/or one or more fabric webs is/are continuously wetted with a liquid plastic and formed in accordance with the profiled part, wherein the fibers and/or the fabric webs and/or the liquid plastic is/are subjected to vibrations in order to dissolve bubbles or defects in the fibers and/or the fabric webs and/or the intermediate spaces. The fabric webs are unwound from rolls or the like and fed to a connecting device. The fibers are also fed to this connecting device by means of other guiding devices. The fibers and the fabric webs are brought together and interlinked with the aid of the connecting device. The connected fibers and fabric webs are fed to a tool arranged downstream of the connecting device. This tool may consist, for example, of a mould core or the like. The fibers are formed together with the fabric webs with the aid of the tool. The fibers and the fabric webs are, in particular, folded. The tool is realized in such a way that the desired shape of the profiled part is achieved after the forming of the fibers and fabric webs.

WO 2007/107007 discloses a pultrusion device with three thermal zones that are thermally insulated from one another, wherein a pre-determined temperature profile is realized with said thermal zones in order to form and subsequently harden a semifinished product being guided through the pultrusion device.

A system for continuously forming an H-shaped fiber-reinforced element is known from DE 601 18 048 T2. The system comprises a device for mounting a number of spools, on which a strip-shaped, pre-impregnated material is wound, wherein said material is manufactured by impregnating thermosetting resin in carbon fibers or glass fibers or the like. A system furthermore features a device for forming the pre-impregnated material into a predetermined H-shape, a pressing device for pressing the pre-impregnated element from four sides, a heating furnace for post-curing the pre-impregnated element and a cutting device for cutting the hardened product into predetermined lengths. When using prepreg semifinished products, a certain resin content is predefined with these products. Furthermore, the manufacture of a component that sectionally or entirely has a relatively large component thickness requires a number of prepregs that can only be processed to a limited degree during the forming of the pre-impregnated material into a predetermined H-shape. In such instances, it may occur, in particular, that folds are created in the curvature regions of the semifinished product arrangement formed into the H-shape. With certain component thicknesses to be realized, it may not be possible to carry out the desired forming of the prepreg arrangement at all. During the forming of the prepreg arrangement, fiber warpages and/or fiber undulations can generally occur. The aforementioned problems with the utilization of prepregs in the method according to DE 601 18 048 T2 lead to a deterioration of the component quality.

A two-stage manufacturing process for manufacturing a plastic component is known from EP 1 621 323 A1, wherein a preform of individual fibers and a [text missing] is initially manufactured, and wherein said preform is impregnated with resin by means of a resin injection method and hardened in a system specifically provided for this purpose in a second step. In the resin injection method, the quantity of the resin injected into the preform cannot be precisely controlled such that it is impossible or at least very difficult to manufacture high-quality components with this method.

DE 698 14 129 T2 discloses a method for manufacturing a plastic component, in which a preform is manufactured from individual unidirectional fibers and prepreg grates, wherein said preform is subsequently impregnated with resin in an injection method and hardened. In this case, the quantity of the respectively injected resin also cannot be precisely controlled and, in particular, not sectionally adjusted. Consequently, a high component quality cannot be achieved with this method. In addition, this method is subject to the aforementioned control expenditures. The injection phase is furthermore time-consuming, particularly with relatively large preforms or components.

SUMMARY OF THE INVENTION

The invention aims to make available a method for manufacturing a profiled preform and a profiled FRP-component, a pultrusion system, as well as a pressing device for implementing the method, by means of which a preform or a FRP-component with cross-sectional segments that extend angularly to one another can be respectively manufactured efficiently and with optimal quality.

According to the invention, this objective is attained with the characteristics of one or more embodiments disclosed and described herein. Other embodiments are also disclosed and described herein.

In the inventive device and in the inventive method, a plurality of semifinished products is used as starting material and processed in a quasi-continuous process. In this context, the term "quasi-continuous process" should be interpreted as a manufacturing method, in which the advance movement of the semifinished product is in fact stopped in time segments, particularly for carrying out a compression process, but in which the preform or the FRP-component is not removed from the system until after the cutting process such that the method can also be considered to be "continuous" in this respect.

In the inventive pultrusion method, plane semifinished products are used as starting material and therefore can, in particular, be wound up on rolls. Such rolls are used in the dispenser unit provided according to the invention. In this case, a multilayer semifinished product arrangement is dispensed by a dispenser unit and fed to the forming device, [text missing] is a combination of several webs of semifinished reinforcement fiber layers and at least one resin film, wherein the semifinished product arrangement contains a binder material in the form of a binder resin for fixing the semifinished reinforcement fiber layers in a proportion between zero and no more than 15% of the total weight of the semifinished reinforcement fiber layers used in the semifinished product arrangement, and wherein at least one resin film is situated between at least two semifinished reinforcement fiber layers.

Instead of using a binder material for fixing the semifinished reinforcement fiber layers, it would also be possible to sew the semifinished reinforcement fiber layers to one another and to introduce said layers into the forming device in this fashion.

In the inventive pultrusion method, the semifinished reinforcement fiber layers of the multilayer semifinished product arrangement that are fed to the forming device may, in particular, not be impregnated with resin.

The semifinished reinforcement fiber layers fed to the forming device may be at least partially composed of fabric layers of reinforcement fibers. The semifinished reinforcement fiber layers may furthermore be at least partially composed of several dry fabric layers that are sewn to one another.

In the inventive pultrusion method, the semifinished reinforcement fiber layers may alternatively or additionally be at least partially composed of bonded fabrics of reinforcement fibers. In this case, the semifinished reinforcement fiber layers may, in particular, be at least partially composed of several bonded fabrics of reinforcement fibers that are sewn to one another.

The semifinished product arrangement may feature a layer of non-woven fabric as binder material.

In the inventive pultrusion method, a binder material in the form of a powdery material may or can be applied onto at least one semifinished reinforcement fiber layer before the semifinished product arrangement is fed into the forming device. The binder may, in particular, be a powdery material consisting of a thermosetting plastic material and/or a thermoplastic material. The thermosetting plastic material may consist of an epoxy resin in this case.

The profiled preform manufactured with an inventive pultrusion method can be processed into a finished FRP-component or a FRP-component in the form of an intermediate product by carrying out additional process steps. According to another inventive pultrusion method, a profiled FRP-component with cross-sectional segments that extend angularly to one another is manufactured. The respective FRP-component may be a finished FRP-component that is assembled with other components or the semifinished product may be an intermediate product that is fed to another process step such as, e.g., another shaping process or a post-curing process. It is also possible to apply reinforcement layers onto the FRP-component and to subsequently subject the FRP-component to a hardening process.

In the inventive pultrusion method or in the inventive pultrusion system, the preform being manufactured or the component being manufactured may be curved, particularly in its longitudinal direction.

According to the invention, a pultrusion method for manufacturing a profiled preform with cross-sectional segments that extend angularly to one another from a plurality of semifinished products in a quasi-continuous process is proposed, wherein said method features the following steps:

dispensing at least one multilayer semifinished product arrangement from a dispenser unit and feeding this semifinished product arrangement into a forming device;

angling at least one cross-sectional segment of the semifinished product arrangement by guiding the semifinished product arrangement through a forming device such that the cross-sectional segments of the semifinished product arrangement form an angle profile, compressing the semifinished product arrangement into the cross-sectional shape, in which it exits the forming device, in a pressing device by, moving together movable tool parts and subsequently moving the tool parts apart from one another, wherein a feed movement of the semifinished product arrangement takes place while the tool parts are moved apart from one another, wherein the semifinished product arrangement is heated in the pressing device such that the heating and the simultaneous compression cause the resin material to cure and the cross-sectional segments of the semifinished product arrangement to be fixed relative to one another in a shape-preserving fashion, as well as a compaction of the cross-sectional segments, and wherein the feed movement of the semifinished product arrangement is interrupted during the compression process;

cutting a longitudinal section off the semifinished product arrangement with the fixed bonded fabrics and removing this longitudinal section as a preform.

According to the invention, it is proposed that the multilayer semifinished product arrangement that is dispensed by the dispenser unit and fed to the forming device is a combination of several plane, dry bonded fabrics, between which at least one resin film is respectively arranged in order to fix the dry bonded fabrics to one another.

In this pultrusion method, the tool parts are moved into a first pressing position and held in this pressing position for a predetermined time in a first step during the compression in the pressing device, wherein the tool parts are then moved relative to one another into a second pressing position, in which at least two tool parts are moved closer together than in the first pressing position, in a second step in order to carry out a subsequent post-compression of the pre-compressed semifinished product arrangement.

The resin material may consist of a binder such that the preform created by the heating and the pressing device is a semifinished fiber product preform. In this case, the binder may consist of a thermosetting plastic material and/or a thermoplastic material. The binder may be introduced between the bonded fabrics in the form of a powdery material. The thermosetting plastic material may consist, in particular, of an epoxy resin. In this pultrusion method, the plurality of plane, dry bonded fabrics may furthermore be unwound from dispenser rolls in the dispenser unit. Binder material may be applied onto one or more dry bonded fabrics in this case after the bonded fabrics are unwound and before the dry bonded fabrics are fed into the forming device.

When utilizing a resin material in the form of a binder, it is possible to additionally process the semifinished fiber product preform after its removal from the pultrusion device in such a way that resin is supplied to the semifinished fiber product preform in a resin infusion process and the preform is subsequently hardened.

In the pultrusion method, the resin material may consist of a resin film such that the preform created due to the heating in the pressing device is a fiber-reinforced plastic (FRP) preform.

Consequently, a semifinished product arrangement that features several plane, dry bonded fabrics is fed to the forming device. Binder material for fixing the plane bonded fabrics to one another generally may be introduced between two respective dry bonded fabrics or a resin film may be introduced between two respective dry bonded fabrics or binder material and a resin film may be respectively introduced between at least two dry bonded fabrics. In this case, resin material may be introduced between dry bonded fabrics and, if the resin material consists of a resin film, a resin film may be arranged between a first sequence of two dry bonded fabrics and no resin material, i.e., no binder or resin film, is arranged between another sequence of dry bonded fabrics.

In the aforementioned pultrusion method, the plurality of plane, dry bonded fabrics may be unwound from dispenser rolls in the dispenser unit.

The semifinished product arrangement fed to the forming device may be guided through the forming device by means of transport rollers that contact the semifinished product arrangement and the orientations of which continuously change referred to the longitudinal direction of the forming device from a position in the entry region to a position in the outlet region of the forming device, [text missing] the position of at least one cross-sectional segment of the semifinished product arrangement is continuously changed to a nominal angular position.

Alternatively, the semifinished product arrangement fed to the forming device may be guided through the forming device by means of a forming channel with forming contours that contact the semifinished product arrangement and continuously change referred to the longitudinal direction of the forming device, wherein the position of at least one cross-sectional segment of the semifinished product arrangement is continuously changed to a nominal angular position.

During the compression in the pressing device, the tool parts may be moved into a first pressing position and held in this pressing position for a predetermined time in a first step, wherein the tool parts are then moved relative to one another into a second pressing position, in which at least two tool parts are moved closer together than in the first pressing position, in a second step in order to carry out a subsequent post-compression of the pre-compressed semifinished product arrangement.

If a resin material in the form of a binder or a resin film is utilized in the aforementioned pultrusion methods, the preform may be additionally processed after its removal from the pultrusion device in such a way that the preform is subjected to a forming process and subsequently hardened.

It would also be possible to locally place reinforcement layers of prepreg onto the preform and to subsequently harden the combination of the preform and the reinforcement layers. Alternatively, it would be possible to locally place reinforcement layers of dry bonded fabrics onto the preform and to subsequently harden the combination of the preform and the reinforcement layers together with a resin film, wherein the resin film is placed between the preform and the next bonded fabric arranged thereon.

According to the invention, a pultrusion method for manufacturing a profiled FRP-component with cross-sectional segments that extend angularly to one another from a plurality of semifinished products in a quasi-continuous process is proposed, wherein said method features the following steps:

dispensing at least one multilayer semifinished product arrangement consisting of at least one plane, dry bonded fabric and at least one resin film from a dispenser unit and feeding this semifinished product arrangement into a forming device;

angling at least one cross-sectional segment of the semifinished product arrangement by guiding the semifinished product arrangement through a forming device such that the cross-sectional segments of the semifinished product arrangement form an angle profile, compressing the semifinished product arrangement into the cross-sectional shape, in which it exits the forming device, in a pressing device by moving together movable tool parts and subsequently moving the tool parts apart from one another, wherein a feed movement of the semifinished product arrangement takes place while the tool parts are moved apart from one another, wherein the semifinished product arrangement is heated in the pressing device such that partial cross-linking of the resin of the resin film takes place, and wherein the feed movement of the semifinished product arrangement is interrupted during the compression process;

hardening the semifinished product arrangement in a tempering furnace such that the resin of the resin film is cross-linked by at least 80%;

cutting a longitudinal section off the hardened semifinished product arrangement and removing this longitudinal section as a FRP-component.

In this pultrusion method for manufacturing a profiled FRP-component, the dry bonded fabric fed to the forming device may consist of a dry fabric layer or of several dry fabric layers that are sewn to one another (NCF). In this case, the plurality of semifinished products fed to the dispenser unit may be supplied by at least one dispenser roll. The arrangement of semifinished products made available by the dispenser unit may be composed, in particular, of a dry bonded fabric and a resin film, wherein a separating foil may be additionally situated on the side of the resin film that faces away from the side with the dry bonded fabric when the semifinished products are dispensed, and wherein the separating foil is removed from the arrangement of semifinished products before it is introduced into the forming device. In this case, a resin film and a separating foil furthermore may, in particular, be wound up on a roll in the form of layers that lie on top of one another and jointly unwound from the roll in order to combine the resin film with a dry bonded fabric and to thusly create a semifinished product arrangement. According to the invention, the arrangement consisting of the dry bonded fabric, the resin film and the separating foil made available by the dispenser unit may, in particular, be supplied by a dispenser roll. In this case, the dispenser unit may, in particular, make available the arrangement consisting of the dry bonded fabric, the resin film and the separating foil by supplying the dry bonded fabric by means of a first dispenser roll and the resin film with the separating foil by means of a second dispenser roll or by supplying the resin film by means of a second dispenser roll and the separating foil by means of a third dispenser roll.

In the inventive method for manufacturing a profiled FRP-component, the arrangement of semifinished products made available by the dispenser unit may be composed of several layers of dry bonded fabric and several resin films, wherein a bottom layer referred to the direction of the gravitational force or the X-direction consists of a resin film and a top layer consists of a layer of dry bonded fabric. The arrangement of semifinished products supplied to the dispenser unit may, in particular, be composed of two dry bonded fabrics and at least two resin films, wherein the top layer and the bottom layer of the arrangement of semifinished products respectively consists of a dry bonded fabric. It would also be possible that the dispenser unit respectively dispenses the at least two plane, dry bonded fabrics and the at least one resin film from a dispenser roll.

In the aforementioned embodiments of the pultrusion method, at least one dry bonded fabric may be provided with a binder in order to fix the individual bonded fabrics.

In the inventive pultrusion method for manufacturing a profiled FRP-component, the position of at least one cross-sectional segment of the semifinished product arrangement may be continuously changed to a nominal angular position while the semifinished product arrangement fed to the forming device is guided through the forming device by means of transport rollers that contact the semifinished product arrangement and the orientations of which continuously change referred to the longitudinal direction of the forming device from a position in the entry region to a position in the outlet region of the forming device. In an alternative embodiment of the inventive pultrusion method, the position of at least one cross-sectional segment of the semifinished product arrangement may be continuously changed to a nominal angular position while the semifinished product arrangement fed to the forming device is guided through the forming device by means of a forming channel with forming contours that contact the semifinished product arrangement and continuously change referred to the longitudinal direction of the forming device.

In the pultrusion method for manufacturing a profiled FRP-component, the heating in the pressing device may be carried out in such a way that the resin of the resin film is cross-linked by at least 40%. The simultaneous compression process may be realized in such a way that the tool parts are moved into a first pressing position and held in this pressing position for a predetermined time in a first step during the compression in the pressing device, and that the tool parts are then moved relative to one another into a second pressing position, in which at least two tool parts are moved closer together than in the first pressing position, in a second step in order to carry out a subsequent post-compression of the pre-compressed semifinished product arrangement.

According to the invention, a pressing device for compressing a semifinished product arrangement with cross-sectional segments that extend angularly to one another is also proposed, wherein said pressing device features:

at least two tool parts that can be moved relative to one another and respectively feature tool part surfaces that extend angularly to one another, wherein a tool part surface of one tool part and a tool part surface of the other tool part respectively lie opposite of one another with oppositely directed surface normals such that cross-sectional segments of the semifinished product arrangement that extend angularly to one another can be brought in contact with the tool parts, two adjusting units for moving one of the tool parts, wherein each adjusting unit is designed in such a way that a linear movement of the movable tool part in the direction of the surface normal of one of the respective tool part surfaces of this tool part can be realized, two guiding units, one of which is respectively coupled between each adjusting unit and the tool part moved by means of this adjusting unit and allows a relative movement of the tool part that extends perpendicular to the linear movement of these adjusting units.

The adjusting units of the pressing device may be designed in such a way that the surface normals of the tool part surfaces of the tool parts that can be moved relative to one another extend perpendicular to one another.

According to the invention, a pultrusion system for manufacturing a profiled preform or FRP-component with cross-sectional segments that extend angularly to one another from a plurality of semifinished products is also proposed, wherein said pultrusion system features: a dispenser unit, a forming device, a pressing tool, a drawgear and a cutting unit. The pressing device may be realized in accordance with one of the above-described embodiments.

The dispenser unit of the pultrusion system may feature at least two dispenser rolls, by means of which the dispenser unit can feed a multilayer semifinished product arrangement consisting of at least one dry bonded fabric and at least one resin film to the forming device.

The forming device according to these embodiments of the pultrusion system may feature a first arrangement of transport rollers and a second arrangement of transport rollers, between which the semifinished product arrangement fed to the forming device is guided in the forming device, wherein the orientations of the transport rollers of each of the transport roller arrangements continuously change from transport roller to transport roller in the longitudinal direction of the forming device, namely from a position in the entry region to a position in the outlet region, such that the position of at least one cross-sectional segment of the semifinished product arrangement is continuously changed to a nominal angular position.

Alternatively, the forming device may feature a forming channel, through which the semifinished product arrangement moved through the forming device is guided, wherein the cross section of said forming channel features forming contours that continuously change in the longitudinal direction of the forming device and are designed in such a way that the position of at least one cross-sectional segment of the semifinished product arrangement continuously changes to a nominal angular position in the outlet region of the forming device while the at least one semifinished product arrangement is guided through the forming channel.

In one of the aforementioned embodiments of the inventive pultrusion system, the pressing device may be provided with a control unit and an adjusting unit, by means of which the tool parts of the pressing device can be additionally moved toward one another with respectively predetermined force progressions within predetermined time intervals in order to carry out a post-compression of a semifinished product arrangement situated in the pressing device. The control unit may feature a function, by means of which the tool parts of the pressing device are moved apart from one another and toward one another again at predetermined times or at times defined by the control unit, wherein the movement of the semifinished product arrangement is realized by actuating the drive unit while the tool parts are moved apart from one another and the movement of the semifinished product arrangement is stopped by actuating the drive unit while the tool parts are moved apart from one another.

BRIEF DESCRIPTION OF THE DRAWINGS

Exemplary embodiments are described below with reference to the enclosed drawings, in which:

FIG. 4d shows a schematic representation of a section of the movable tool part according to FIGS. 4b and 4c in the form of a top view, wherein FIG. 4b shows a partial side view of a detail of the object illustrated in FIG. 4d;

DETAILED DESCRIPTION OF THE INVENTION

Figure 1:
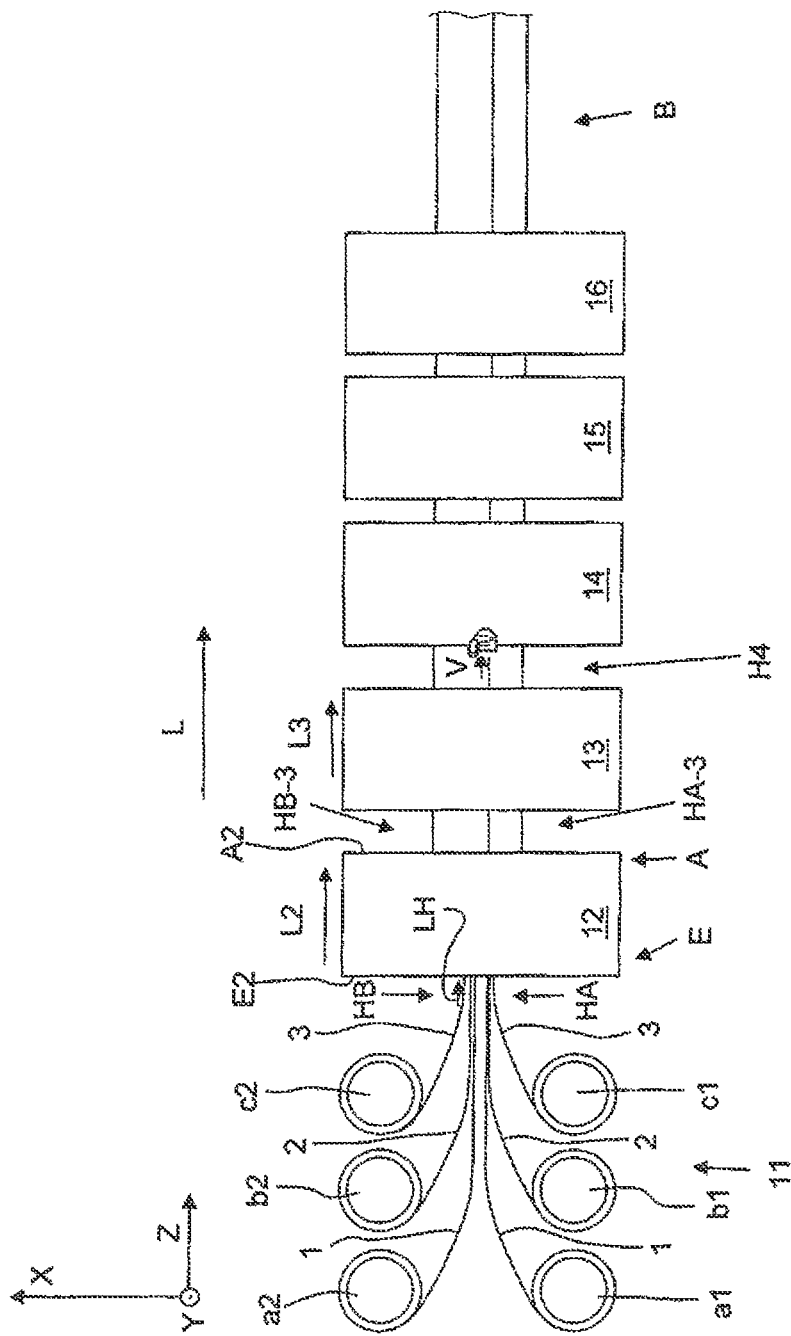
FIG. 1 shows a schematic representation of an exemplary embodiment of the inventive pultrusion system for manufacturing a profiled FRP-component with cross-sectional segments that extend angularly to one another with a dispenser unit, a forming device, a pressing tool, a drawgear and a cutting unit, wherein two semifinished product arrangements that may be respectively composed, in particular, of at least two plane semifinished reinforcement fiber layers and at least one resin film situated between these layers are fed to the forming device in the exemplary embodiment shown in order to manufacture the profiled FRP-component.

In the inventive pultrusion method or in the inventive pultrusion system P for manufacturing a profiled preform or a FRP-component (not-illustrated in the figures), particularly with respective cross-sectional segments that extend angularly to one another, at least one multilayer semifinished product arrangement is dispensed by a dispenser unit 11 and fed to a forming device 12.

In an inventive pultrusion method for manufacturing a profiled preform, the semifinished product arrangement fed to the forming device 12 in order to manufacture a profiled preform is composed of several plane, dry bonded fabric layers or fabric layers 1, 3, wherein a binder material for fixing the plane bonded fabrics to one another is respectively introduced between two dry bonded fabric layers or fabric layers.

In another inventive pultrusion method, particularly for manufacturing a profiled FRP-component with cross-sectional segments that extend angularly to one another, the semifinished product arrangement HA fed to the forming device 12 consists of a combination of several webs of semifinished reinforcement fiber layers 1, 3 and at least one resin film 2.

According to the invention, the semifinished reinforcement fiber layers may consist of a fabric and/or a bonded fabric. In this context, the term fabric refers to a structured overlay of weft and warp threads that extend transverse to one another. The term bonded fabric refers to a plurality of unidirectionally extending reinforcement fibers that are sewn to one another in the direction of the thickness of the bonded fabric. The semifinished reinforcement fiber layers provided in accordance with the invention may be used in the dispenser unit in the form of dry semifinished reinforcement fiber layers or be provided with a binder material only and are fed from the dispenser unit to the forming device 12. The term "dry" semifinished reinforcement fiber layers refers to the fact that the semifinished reinforcement fiber layers, i.e., the fabric layers or bonded fabric layers, are not impregnated with resin. According to the invention, semifinished reinforcement fiber layers that contain a binder material and therefore resin may be alternatively or additionally used. Since the resin is merely used as a binder material in this case, it does not serve as matrix material, but rather merely for fixing different semifinished reinforcement fiber layers relative to one another. The semifinished product arrangement HA therefore contains a binder resin in a proportion of no more than 15% of the total weight of the semifinished reinforcement fiber layers 1, 3 used in the semifinished product arrangement HA as binder material for fixing the semifinished reinforcement fiber layers thereof.

The binder material may be used in the form of a powder, a liquid material that is sprayed on or a non-woven fabric. A powder or a liquid material that is sprayed on may consist of a resin, particularly an epoxy resin. In this case, the binder material may already be applied onto the semifinished reinforcement fiber layers in the dispenser unit, particularly onto the semifinished reinforcement fiber layers that are wound up on the dispenser rolls.

Due to the utilization of the aforementioned materials, components can be manufactured efficiently and with high component quality. The components may also have a relatively complex geometry. The components may, in particular, feature a cross-sectional surface with cross-sectional segments that extend angularly to one another. In addition, the components may alternatively or additionally be curved in their longitudinal direction (Z-direction) or in the feed direction. The materials used make it possible to form the inventive semifinished reinforcement fiber layers accordingly, namely without fiber warpages or fiber undulations that would lead to a deterioration of the component quality. This is achieved due to the fact that only very low shearing forces occur between the semifinished reinforcement fiber layers during the inventive forming thereof. The utilization of a resin film makes it possible, in particular, to very precisely meter and evenly distribute the quantity of resin such that a relatively constant fiber volume content can be adjusted in the component to be manufactured. The manufacture of a component without pores, in particular, can be ensured in this fashion. In the exemplary embodiment, in which at least one resin film is wound up in the dispenser unit, the inventive device can also be used for a plurality of variations of the component to be manufactured.

The resin film may consist of a closed resin film or a continuous sheet-like resin film or a resin film that is closed over up to 90% of the surface. The resin film that is not entirely closed or closed over up to 90%, in particular, does not have the shape of, e.g., a grate such that porosities in the component to be manufactured are prevented. The resin film may not be entirely closed due to manufacturing-related defects.

In the exemplary embodiment of the inventive pultrusion method or the inventive pultrusion device illustrated in FIG. 1, two semifinished product arrangements HA, HB, namely a first semifinished product arrangement HA and a second semifinished product arrangement HB, are dispensed to the forming device by the dispenser unit 11. In this case, each of the semifinished product arrangements HA, HB may be composed of two dry bonded fabric layers or fabric webs 1, 3 and a resin film 2 arranged in between as it is also the case in the method and the device for manufacturing a profiled FRP-component from at least one plane, dry bonded fabric and at least one resin film.

The pultrusion method or the pultrusion device illustrated in FIG. 1 is generally suitable for manufacturing a profiled FRP-component from at least one multilayer semifinished product arrangement that is dispensed by a dispenser unit and respectively composed of at least one plane, dry bonded fabric or fabric 1, 3 and at least one resin film 2.

In this variation, the device and the method may be optionally realized such that the dispenser unit 11 not only dispenses the semifinished product arrangements HA, HB, but also another multilayer semifinished product arrangement that is composed of at least two plane, dry semifinished reinforcement fiber layers, particularly bonded fabric layers and/or fabric layers 1, 3, and at least one resin film 2 arranged in between, wherein both semifinished product units H1, H2 are fed to the forming device 12 adjacent to one another and, in particular, on top of one another in this case. At least one resin film 2 may, in particular, be respectively arranged between two dry semifinished reinforcement fiber layers, particularly bonded fabric layers and/or fabric layers 1. It is also possible to provide more than two resin films 2 in one or more of the semifinished product arrangements used. Each of the semifinished product arrangements is realized in such a way that the top and the bottom layers thereof consist of dry semifinished reinforcement fiber layers, particularly bonded fabric layers and/or fabric layers, between which at least one resin film 2 and optionally at least one other dry bonded fabric layer and/or fabric layer 1 is arranged.

The pultrusion method or the pultrusion device illustrated in FIG. 1 furthermore is generally suitable for manufacturing a profiled preform with cross-sectional segments that extend angularly to one another from at least one multilayer semifinished product arrangement HA that is composed of several plane, dry semifinished reinforcement fiber layers or semifinished reinforcement layers provided with binder material, particularly bonded fabric layers and/or fabric layers (in this respect, the reference symbols 1, 2, 3 respectively denote such a semifinished reinforcement fiber layer), wherein a binder material may be introduced between two respective semifinished reinforcement fiber layers, particularly in powdery form, in order to fix the plane bonded fabrics to one another, and wherein the dry semifinished reinforcement fiber layers are dispensed by the dispenser unit 11 and fed to a forming device 12. FIG. 1 shows a variation of this exemplary embodiment of the invention, in which two semifinished product arrangements are illustrated that respectively feature three dry bonded fabrics 1, 2, 3, between which binder material is respectively introduced in order to fix the plane semifinished reinforcement fiber layers to one another (not shown in FIG. 1). The binder may consist of a thermosetting plastic material or a thermoplastic material, wherein the thermosetting plastic material may be an epoxy resin. The binder material may be applied onto one or more dry bonded fabrics before the dry bonded fabrics are fed into the forming device 12. The plurality of plane, dry semifinished reinforcement fiber layers 1, 2, 3 can be unwound from dispenser rolls in the form of plane semifinished reinforcement fiber layers in the dispenser unit 11 as illustrated in FIG. 1. However, the semifinished reinforcement fiber layers may also be fed to the forming device 12 in a different fashion.

The pultrusion method or the pultrusion device illustrated in FIG. 1 also is generally suitable for manufacturing a profiled preform with cross-sectional segments that extend angularly to one another from at least one multilayer semifinished product arrangement HA that is composed of several plane semifinished reinforcement fiber layers according to the invention, wherein a resin film (reference symbol 2) and/or binder material, particularly in powdery form, is respectively introduced between two inventive semifinished reinforcement fiber layers, particularly dry (i.e., not yet resin-impregnated) semifinished reinforcement fiber layers, in order to fix the plane bonded fabric layers and/or fabric layers to one another, and wherein the dry bonded fabric layers and/or fabric layers and the resin film are dispensed by the dispenser unit 11, e.g., by means of rolls, and fed to a forming device 12. FIG. 1 shows a variation of this exemplary embodiment of the invention with a first semifinished product arrangement HA that features two dry bonded fabric layers and/or fabric layers and a resin film arranged between these layers, as well as a second semifinished product arrangement HB that is composed of three dry bonded fabric layers and/or fabric layers, between which binder material is respectively introduced in order to fix the plane bonded fabric layers and/or fabric layers to one another (not shown in FIG. 1).

In all above-described exemplary embodiments, it is also possible to utilize a layer of prepreg material as intermediate layer or several layers of prepreg material as intermediate layers. If the aforementioned methods are used for manufacturing preforms that are curved in their longitudinal direction or components that are curved in their longitudinal direction, exactly one or no more than two additional prepreg layers can be used as intermediate layers between the semifinished product layers that are supplied by the dispenser unit 11 as starting material and feature a cross-sectional segment that lies in the curvature plane of the preform or component to be manufactured. In this case, several prepreg layers, particularly in the form of prepreg stacks, may furthermore be used for layers without a cross-sectional segment that lies in the curvature plane. In the latter instance, prepreg layers are preferably applied onto the semifinished product arrangement fed to the pressing tool downstream of the forming device and upstream of the pressing tool. This can be used, in particular, for realizing or reinforcing the sides of a flange.

In the schematic representation according to FIG. 1, in which the aforementioned exemplary embodiments of the invention are illustrated or shown, the semifinished products—the dry bonded fabric layers and/or fabric layers 1, 3 and the resin film 2 or the bonded fabric layers and/or fabric layers 1, 2, 3 and the respectively optional prepreg—are wound up on rolls in the dispenser unit 11 such that these semifinished products can be withdrawn from the dispenser unit 11 by exerting a corresponding tensile force with the aid of a drawgear 15. In this case, each layer 1, 2, 3 is wound up on a separate roll. The dispenser unit 11 features, in particular, at least three dispenser rolls a1, b1, c1.

With respect to the method or the manufacture of a profiled preform, FIG. 1 shows that a plane, dry bonded fabric 1, 3 is respectively wound up on a first roll a1 and a third roll c1 and a resin film 2 is wound up on a third roll arranged between the two aforementioned rolls in order to be dispensed to the forming device 12. In this way, the dispenser unit 11 is able to feed at least one multilayer semifinished product arrangement HA that is composed of at least two plane, dry bonded fabric layers and/or fabric layers 1, 3 and at least one resin film 2 arranged between these layers to the forming device 12. Six rolls a1, b1, c1, a2, b2, c2 are illustrated in the exemplary embodiment according to FIG. 1, wherein the rolls a1, b1, c1 are provided for winding up and dispensing a first semifinished product arrangement HA that is composed of two dry bonded fabric layers and/or fabric layers 1 and a resin film 2 arranged between these layers, and wherein the rolls a2, b2, c2 are provided for winding up and dispensing a second semifinished product arrangement H2 that is also composed of two dry bonded fabric layers and/or fabric layers 1 and a resin film 2 arranged between these layers.

With respect to the method or the manufacture of a profiled preform, FIG. 1 shows that two roll arrangements are provided that respectively feature a first roll a1, a second roll b1 and a third roll c1, wherein a plane, dry bonded fabric layer and /or fabric layer 1, 2, 3 is respectively wound up on a first roll a1, a second roll b1 and a third roll c1. In this embodiment of the method or the device, it would also be possible to unwind only one dry bonded fabric layer and/or fabric layer from a roll and to feed this layer to the forming device 12. As mentioned above, FIG. 1 may also represent another exemplary embodiment of the inventive device or the inventive method, in which the preform is composed of several plane, dry bonded fabric layers and/or fabric layers (in this respect, the reference symbols 1, 3 respectively denote a dry bonded fabric layer and/or fabric layer) and a resin film (reference symbol 2) and/or binder material that is respectively introduced between two dry bonded fabric layers and/or fabric layers.

The dry bonded fabric layers and/or fabric layers used for the aforementioned exemplary embodiments of the invention preferably consist of a flat bonded fabric of dry reinforcement fibers or dry fiber material and, e.g., an NCF or C-fiber fabric. Rigid fibers with a high tensile strength, e.g., of aramid, glass, carbon, boron or silicone, may generally be considered as fibers in this case. When using semifinished prepreg products, i.e., semifinished products that are pre-impregnated with a matrix resin, the reinforcement fibers of the bonded fabric layers and/or fabric layers are already provided with matrix resin and the prepreg may consist, in particular, of an EP-prepreg.

Thermosetting plastic materials such as unsaturated polyester resins (UP), phenol (PF), epoxy resins (EP) or vinyl ester (VE) or thermoplastic materials such as polypropylene (PP), polyamide (PA), polyetheretherketone (PEEK), polyetherketoneketone (PEKK) or polyphenylene sulphone (PPS) may be used for the resin film. The resin film may consist, in particular, of an epoxy resin film.

The multilayer semifinished product arrangements are successively fed to a forming device 12 and a pressing tool 13 in order to reshape the semifinished product arrangements into an integral or one-piece semifinished product arrangement.

In the embodiment of the invention for manufacturing a profiled preform, a semifinished product arrangement with fixed bonded fabrics is formed by means of the pressing device 13, a longitudinal section is cut off the semifinished product arrangement and this longitudinal section is removed as preform.

In the other embodiment of the invention for manufacturing a profiled FRP-component, the semifinished product arrangement HA3 is heated and compressed in the pressing device 13 such that an impregnation of the semifinished fiber product and partial cross-linking of the resin of the resin film takes place due to this application of pressure and temperature, wherein the feed movement of the semifinished product arrangement is interrupted during the compression process, the semifinished product arrangement HA4 is optionally hardened in a tempering furnace 14 such that the resin of the resin film is cross-linked by at least 80%, a longitudinal section is cut off the hardened semifinished product arrangement HA4 and this longitudinal section is removed as FRP-component. In this case, a drawgear 15 is arranged downstream of the tempering furnace 14 referred to the dispenser unit 11, wherein said drawgear sets the at least one semifinished product arrangement HA, HB in motion and withdraws it from the dispenser unit 11. A cutting unit 16 arranged downstream of the drawgear 15 cuts the meanwhile hardened semifinished product arrangement into predetermined length sections that are used for manufacturing the component B or components in additional stages of the production process. In this exemplary embodiment, the inventive pultrusion system P may feature: a dispenser unit 11, a forming device 12, a pressing tool 13, an optional tempering furnace 14, a drawgear 15 and a cutting unit 16.

Figure 2A:
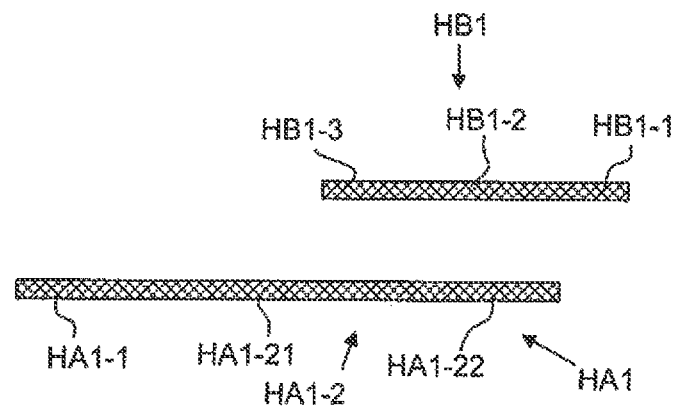
FIGS. 2a, 2b, 2c show schematic representations of three different states of the shape of the two exemplary semifinished product arrangements, which these semifinished product arrangements can successively assume while they are moved through the forming device, wherein the semifinished products are still guided in the forming device at a distance from one another in the initial forming phases in the forming device (FIGS. 2a, 2b) and the semifinished products are jointly guided in the outlet region of the forming device (FIG. 2c)
Figure 2B:
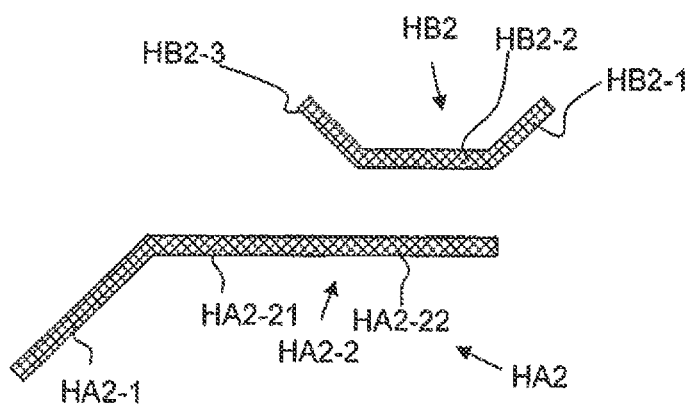
Figure 2C:
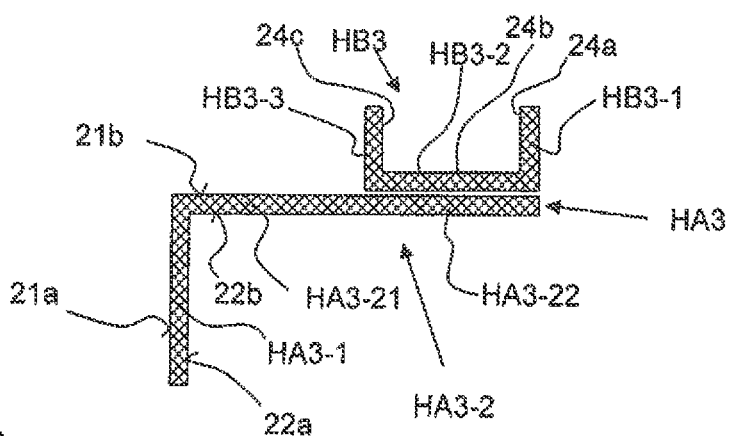
Figure 3:
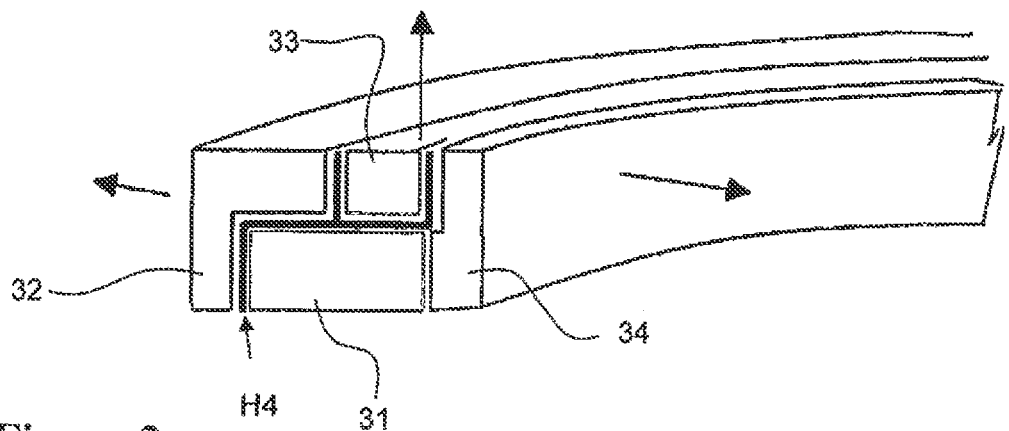
FIG. 3 shows a schematic perspective representation of one embodiment of the pressing tool of the pultrusion system in the form of an oblique top view, wherein this embodiment can be used in the inventive method for manufacturing a profiled preform from several semifinished reinforcement fiber layers and, in particular, plane, dry bonded fabric layers and/or fabric layers and an optional binder material that is respectively introduced between these layers, as well as in the inventive method for manufacturing a profiled FRP-component from at least two plane semifinished reinforcement fiber layers and at least one resin film situated between these layers.

In all above-described exemplary embodiments, the forming device 12 is a contour-shaping tool with an entry region E2 on an entry side and an outlet region A2 on an outlet side that is spaced apart from the entry region in the longitudinal direction L of the pultrusion system P or the semifinished product arrangements HA and HB guided through this system. At least one semifinished product arrangement HA is generally fed to the forming device 12 and sectionally angled therein (FIGS. 2a to 2c) in order to obtain a semifinished product arrangement HA3, HB3 with the same or a similar cross-sectional shape as the component B to be manufactured on the outlet side A2. In the embodiment of the inventive method or the inventive device illustrated in FIGS. 1 to 4, a formed body consisting of two semifinished product arrangements is fed to the forming device 12. In a pultrusion system P for forming and processing two or more semifinished product arrangements HA1, HB1 dispensed by the dispenser unit 11, these semifinished product arrangements are generally fed into the forming device 12 in such a way that they are placed against one another or on top of one another referred to the horizontal plane, i.e., as a formed body. In this forming device, at least one cross-sectional segment of the semifinished product or one semifinished product region is sectionally angled relative to an adjacent cross-sectional segment or semifinished product region (FIG. 2b). Consequently, the semifinished product arrangements HA3, HB3 exit the forming device 12 at its outlet A2 with a cross-sectional shape, the cross-sectional segments of which have the same orientation as the same cross-sectional segments of the component to be manufactured, i.e., the semifinished product arrangements HA3, HB3 have a cross-sectional shape that is similar or identical to the cross-sectional shape of the component to be manufactured (FIG. 2c).

The semifinished product arrangement or the several semifinished product arrangements HA3, HB3 that lie on top of one another at the outlet of the forming device are fed to the pressing tool, in which the two semifinished product arrangements HA3, HB3 lying on top of one another are compressed into a one-piece semifinished product arrangement H4 under the influence pressure and optionally heat.

According to the invention, it is proposed, in particular, to manufacture semifinished products with angle profiles in the forming device and the pressing tool 13 arranged downstream thereof, i.e., profiles with cross-sectional segments or regions that extend relative to one another at an angle other than 0 degrees or 180 degrees. This makes it possible to manufacture T-profiles, L-profiles, H-profiles, omega profiles or compound shapes of the aforementioned profiles, i.e., profiles with angularly extending semifinished product surfaces or cross-sectional segments of the semifinished product that extend perpendicular or at another angle relative to a cross-sectional base segment. The angled cross-sectional regions of the at least one semifinished product arrangement exiting the forming device consequently form a flange or collar that extends in the longitudinal direction LH of the semifinished product arrangement.

The forming device 12 features a (not-shown) receiving and guiding unit, by means of which the cross section of the at least one semifinished product arrangement HA1, HB1 is changed from an initial shape into a nominal cross-sectional shape. According to one exemplary embodiment, the receiving and guiding unit features a forming channel (not illustrated in the figures), through which the at least one semifinished product arrangement HA, HB is guided, wherein the cross section of said forming channel features forming contours that continuously change in the longitudinal direction L2 of the forming device 12, and wherein the position of at least one cross-sectional segment of the semifinished product arrangement is changed on said forming contours. Consequently, the receiving and guiding unit receives the at least one semifinished product arrangement and, in particular, one or more regions thereof and holds these regions in a continuously changing position during the passage through the forming device 12 such that the positions of regions of the semifinished product arrangements are guided in dependence on the position in the forming device. In this case, the receiving and guiding unit is designed in such a way that the regions are continuously changed from an initial position into a nominal position during the passage of the at least one semifinished product arrangement through the forming device. The semifinished product arrangement is fed to the pressing tool 13 in such a way that these regions are situated in their nominal positions.

In order to control the positional change of semifinished product regions, the receiving and guiding unit may feature roller guides with rollers and, e.g., cylindrical rollers alternatively or additionally to the forming contours, wherein the axes of said rollers extend transversely or vertically referred to the feed direction V of the semifinished product arrangement. In this case, rollers may also be arranged on top of one another referred to the longitudinal direction L2 of the forming device 13, i.e., vertically referred to the longitudinal direction L2, such that, e.g., several arrangements consisting of at least two rolls arranged on top of one another may be successively arranged in the longitudinal direction L2 in such a way that a semifinished product arrangement HA, HB can be passively guided through or, if the rollers are driven, guided through the forming device 13 with the assistance of the rotating rollers. Rollers that are arranged successively in the feed direction may have a continuously changing position in the longitudinal direction L2 in order to change the position of semifinished products or semifinished product regions while they are guided by the rollers. The upper rollers, i.e., the rollers situated above the semifinished product arrangement while it is guided through the forming device, may also be at least sectionally offset relative to the lower rollers in the longitudinal direction L2. Receiving and/or guiding means for holding and guiding the semifinished product arrangement may be provided between the rollers.

Such a receiving and guiding unit makes it possible to shift a region or several cross-sectional regions of at least one semifinished product arrangement being guided through the forming tool into a nominal position on the outlet side A2.

Different exemplary embodiments of the forming device 12 and of the forming of semifinished product arrangements are described below with reference to FIGS. 2a, 2b and 2c. In order to manufacture a semifinished product arrangement according to FIG. 2c, plane semifinished product arrangements HA1, HB1 dispensed by the dispenser unit 11 are initially fed into the forming device 12 (FIG. 2a), wherein a first semifinished product arrangement HA1 is situated vertically above the second semifinished product arrangement HB1 referred to the longitudinal direction L2 or X-axis. These semifinished product arrangements HA1, HB1 are spaced apart from one another in the X-direction in the first section of the forming device 12, wherein the upper semifinished product arrangement HB1 is positioned above the lower semifinished product arrangement HA1 referred to the horizontal direction or Y-direction in such a way that two adjacent segments HA1-1 and HA1-21 are not covered by the upper semifinished product arrangement HB1 and the upper semifinished product arrangement HB1 extends beyond the lower semifinished product arrangement HA1 in the horizontal direction or Y-direction with a first segment HB1-1.

The orientation of the semifinished product arrangement introduced into the forming device also does not have to extend horizontally.

The receiving and guiding unit or the forming contours of the forming device 13 are realized in such a way that an outer edge segment HA1-1 of the cross section of the lower semifinished product arrangement HA that is not covered by the upper semifinished product arrangement HB1 is increasingly angled relative to a second segment HA2-1 of the lower semifinished product arrangement during the movement of the semifinished product arrangements in the feed direction V (FIG. 1) due to the forming contours of the forming tool 12. After an initial forming stage that is illustrated in FIG. 2b, the lower semifinished product arrangement has an angled cross-sectional profile with a first segment HA3-1 that extends straight and a second segment HA3-2 that also extends straight and at an angle of 45 degrees referred to the first region HA3-1. The receiving and guiding unit is furthermore designed in such a way that the two cross-sectional edge segments HB1-1 and HB1-3 of the upper semifinished product arrangement HB1 are increasingly angled relative to the central segment HB1-2 situated in between while this semifinished product arrangement is guided through the forming device 12. FIG. 2b shows the states HA2, HB2 of the semifinished product arrangement at a location of the forming tool 12 between and approximately in the center between the entry side E3 and the outlet side A3. In this case, the outer cross-sectional segments HB2-1 and HB2-3 of the upper semifinished product arrangement HB2 are angled b approximately 45 degrees, i.e., by approximately half the angle that the semifinished product segments have in their nominal position on the outlet side A3. FIG. 2c, in contrast, shows the nominal state of the semifinished product arrangements at the outlet A1 of the forming device 12, in which the semifinished product arrangements are fed to the pressing tool 12 in accordance with the invention. In this nominal state, the cross section of the lower semifinished product arrangement HA3 has an angular profile with a first segment HA3-1 that extends straight and a second segment HA3-2 that also extends straight and at an angle of 90 degrees referred to the first region HA3-1. In this case, the upper semifinished product arrangement HB3 arranged on the first or lower semifinished product arrangement HA3 furthermore has a U-shaped cross section with a central segment HA3-1 that is situated on the first segment HA3-1 of the lower semifinished product arrangement HA3 and two segments HA3-1 and HA3-2 that extend vertically from the central segment on its ends. The upper semifinished product arrangement HB3 is positioned on the lower semifinished product arrangement HA3 in such a way that the second segment HA3-2 has a section HA3-21 that is not covered by the central segment HA3-2 of the upper semifinished product arrangement HA3 (in the intermediate state shown in FIG. 2c, this is the section HA2-21) and a section HA3-22 that is covered by the central segment HA3-2 of the upper semifinished product arrangement HA3 (in the intermediate state shown in FIG. 2c, this is the section HA2-22).

In another embodiment of the forming device 12, a first and/or a second tool part is/are realized such that they can be moved relative to one another by means of (not-shown) adjusting units. In this case, the upper tool part preferably can be moved relative to the lower tool part in a translatory fashion. The tool halves of the forming device 12 can be moved relative to one another by means of an adjusting unit and a drive unit coupled thereto. It would also be possible to close the tool by applying a predetermined force in order to compress the at least one semifinished product arrangement H being guided through the forming device 12 in a predetermined fashion such that the tool halves can operate as a pressing tool. The forming device 12 therefore may be realized in the form of a pressing-shaping tool.

The upper tool part may also be spatially movable relative to the lower tool part. The gap dimension or the size of the channel formed between the tool parts for receiving and guiding through the semifinished product arrangement can be adjusted in this way. This furthermore makes it possible to move, i.e., to open and close, the tool parts, particularly during the pultrusion process, in order to support the transport or to inhibit the transport while the tool parts are moved together. This measure is particularly suitable for instances, in which a speed control is provided for a downstream unit such as the pressing tool 13, the tempering furnace 14 and/or the cutting unit 16.

Preforms or FRP-components with complex structures can be manufactured by means of the pultrusion system P due to the combination of two or more than two semifinished product arrangements HA, HB or HA1, HB2 fed to the forming device 12 and the forming of semifinished product regions in the forming device 12.

In the exemplary embodiment shown, several semifinished product arrangements HA, HB fed from the dispenser unit 11 to the entry side A3 of the forming device 12 in the form of plain semifinished products were shaped into a formed body of semifinished product arrangements that has different cross-sectional shapes HA3, HB3 on the outlet side A3, wherein the component B to be manufactured also has these different cross-sectional shapes with respect to the orientations of the cross-sectional segments. The cross section of the formed body of the entire semifinished product arrangement on the outlet side A2 has, in particular, at least two cross-sectional semifinished product segments HA3-21 and HA3-1 that extend angularly to one another, i.e., the longitudinal directions or center lines of two adjacent cross-sectional semifinished product segments HA3-21 and HA3-1 extend at an angle relative to one another.

Consequently, the adjacent cross-sectional semifinished product segments HA3-21 and HA3-1 have upper sides 21a and 21b, the surface normals of which extend angularly to one another, namely surfaces that extend perpendicular to one another in the special instance and in the exemplary embodiment illustrated in FIG. 2c.

In the exemplary embodiments of the invention for manufacturing a profiled preform, the dry bonded fabrics and the resin material are heated in the pressing tool. When utilizing a binder, the heating causes the binder to initially liquefy and to subsequently harden. Pressure is simultaneously exerted upon the semifinished product arrangement in the pressing tool in order to realize a compaction thereof. If a binder is utilized, the hardening of the binder and the compaction of the cross-sectional segments fix the cross-sectional segments of the semifinished product arrangement HA3 relative to one another in a shape-preserving fashion. When utilizing a resin material in the form of a resin film, the heating causes the resin to initially liquefy and the bonded fabrics are subsequently impregnated and compacted in the pressing tool under the simultaneously influence of heat and pressure such that the cross-sectional segments of the semifinished product arrangement HA3 are fixed relative to one another in a shape-preserving fashion.

In the exemplary embodiments of the invention for manufacturing a profiled FRP-components, the semifinished product arrangement HA3 is heated and compressed in the pressing tool 13 such that an impregnation of the semifinished fiber product and partial cross-linking of the resin of the resin film takes place under the influence of pressure and heat, wherein the feed movement of the semifinished product arrangement is interrupted during the compression process. Subsequently, the semifinished product arrangement H4 may be optionally hardened in a tempering furnace 14, in which the resin of the resin film is cross-linked by at least 80%. The hardening or partial hardening may also take place in the pressing tool 13 in this method. If the semifinished product arrangement is hardened in a tempering furnace 14, it is hardened and the resin is at least partially cross-linked, preferably by 40% to 70%, in the pressing tool 13 such that a "free-standing cure" is achieved, i.e., stand-alone cross-sectional segments of the semifinished product arrangement are realized. For this purpose, the semifinished product arrangement is heated in the pressing tool 13, in particular, to a temperature between 100 degrees and 200 degrees when epoxy resin is used for the resin film and, in particular, to a temperature between 300 degrees and 400 degrees when thermoplastic materials are used for the resin film. Alternatively, a heating process, during which the resin is cross-linked by at least 90% or even 100%, may be carried out in the pressing tool 13.

Figure 4A:
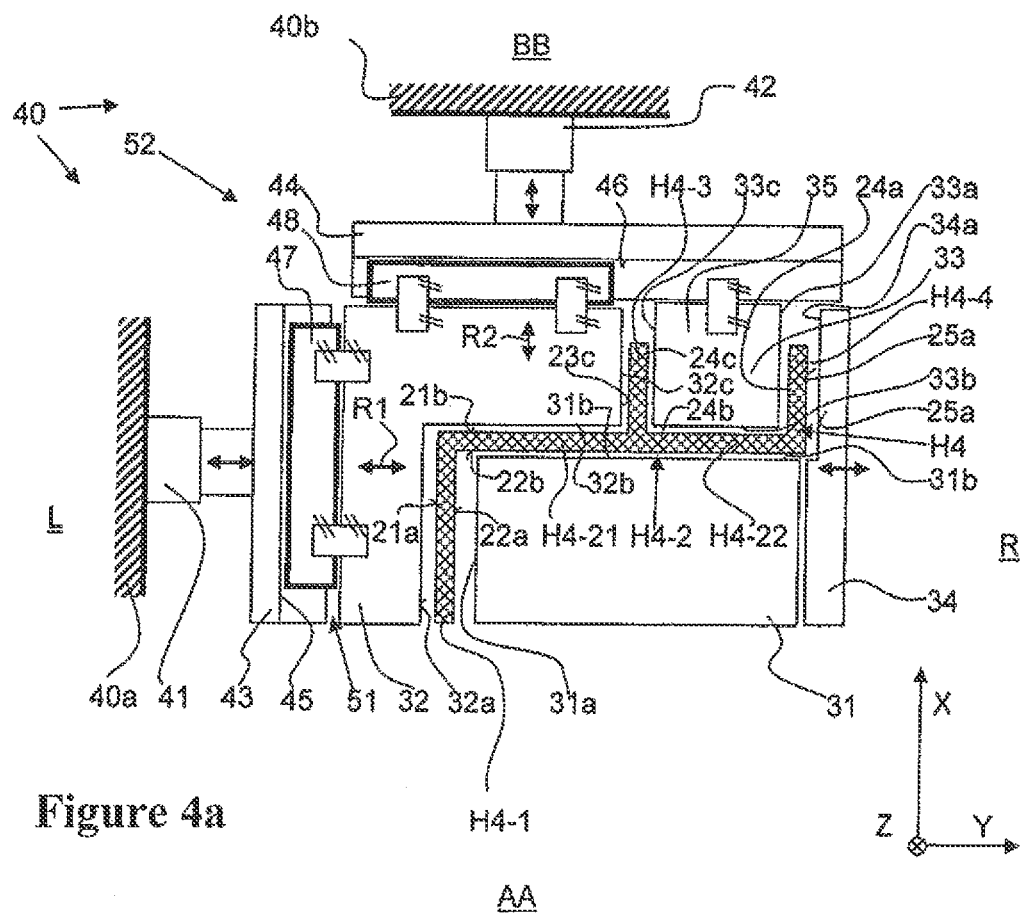
FIG. 4a shows a schematic cross-sectional representation of an embodiment of the pressing device that is schematically illustrated in FIG. 3, wherein the tool parts, guiding units for moving the tool parts and a formed body that was a formed into, in particular, a one-piece semifinished product arrangement by means of the pressing tool are also shown in this figure.
Figure 4B:
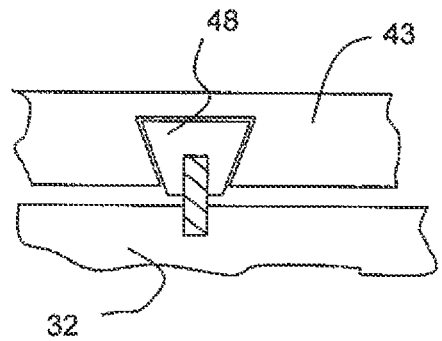
FIG. 4b shows an embodiment of a guiding unit with a guide groove that is arranged in a tool part receptacle and a guide element that is arranged on one tool part and engages into the guide groove with a positive fit in order to allow a longitudinal displacement of one tool part in the pressing device.

The pressing tool 13 illustrated in FIG. 4a is provided for compressing a formed body HA-3, HB-3 of semifinished product arrangements in the aforementioned exemplary embodiments of the method or the device and features a base tool part or first tool part 31, onto which the formed body HA-3, HB-3 of semifinished product arrangements according to FIG. 2c can be placed. The formed body of semifinished product arrangements HA3 and HB3 according to FIG. 2c features a lower semifinished product arrangement HA3 referred to the X-direction and an upper semifinished product arrangement HB3, a semifinished product arrangement that lies on the lower semifinished product arrangement. The base tool part 31 is provided for receiving the formed body HA-3, HB-3 of semifinished product arrangements such that the lower semifinished product arrangement HA3 of the formed body is positioned on the base tool part 31. The first segment HA3-1 of the lower semifinished product arrangement HA3 extends in the horizontal direction on a first tool surface 31a of the base tool part 31 that has a horizontally extending surface contour when the arrangement HA3 is placed on the tool part. The second segment HA3-2 that extends straight and at an angle of 90 degrees relative to the first region HA3-1 lies on a second tool surface 31b of the base tool part 31 that has a vertically extending surface contour when the arrangement HA3 is placed on the tool part. The tool surface of the base tool part 31 with the first and second tool surfaces 31a, 31b is realized in such a way that, when the semifinished product arrangement HA3 is in a predetermined position on the base tool part 31, the sides 22a, 22b of the semifinished product regions HB3-1 and HB3-2 that face the. base tool part can be brought in contact with the tool surface of the first tool part 31 and thusly placed thereon. Accordingly, the surface 22a of the semifinished product segment HA3-1 faces and lies on a first tool surface 31a of the base tool part 31 with the vertically extending surface contour illustrated in the exemplary embodiment and the surface 22b of the semifinished product segment HA3-2 faces and lies on the second tool surface 31b with the horizontally extending surface contour.

Consequently, the pressing tool 13 generally features at least one tool part 32 with two tool part surfaces that extend angularly to one another, wherein said tool part can be moved relative to a tool part 31 that acts as a counter surface and has two tool part surfaces that extend angularly to one another by means of at least one the adjusting unit, and wherein the tool parts are arranged in such a way that a tool part surface of one tool part and a tool part surface of the other tool part respectively lie opposite of one another with oppositely directed surface normals such that the cross-sectional segments of the semifinished product arrangement HA3, HB3 that extend angularly to one another can be brought in contact with the tool parts.

A second tool part 32, a third tool part 33 and a fourth tool part 34 are provided in order to press the formed body of semifinished product arrangements HA3, HB3 against the first tool part 31. In one embodiment of the pressing tool 13, the first or base tool part 31 is realized in the form of a supporting part of the pressing tool 13 and therefore not movable, but the first tool part 31 may also be realized such that it can be moved by means of an adjusting unit.

The second tool part 32 situated on a first side L of the pressing tool 13 features a first tool surface 32a that is positioned opposite of the vertically extending surface 31a of the first tool part 31 and extends parallel thereto. The second tool part 32 can be moved relative to the first tool part 31 in the Y-direction and, in particular, in the direction of the normal of the opposite tool surface 31a of the first tool part 31 or in the direction of a first side R by means of a first adjusting unit such that the first segment HA3-1 of the lower semifinished product arrangement HA3 situated between the first and the second tool part 31, 32 can be compressed into the segment H4-1 by moving together the tool parts 31, 32 in the Y-direction (movement R1).

The second tool part 32 of the pressing tool 13 according to FIG. 4a can furthermore be moved in the X-direction by means of a second adjusting unit 42 such that the second segment HA3-21 of the lower semifinished product arrangement HA3 that is not covered by the upper semifinished product arrangement HA3 can be compressed into the segment H4-21 by moving together the first and the second tool part 31, 32 in the X-direction (movement R2).

In the embodiment of the pressing tool 13 according to FIG. 4a, a third tool part 33 is provided and situated above the first tool part 31, i.e., in the direction toward an upper side BB referred to the first tool part 31, wherein this third tool part can be inserted (FIG. 4a) into the cross-sectional recess above the central segment HB3-2 of the upper semifinished product arrangement HB3 (FIG. 2c). The cross-sectional recess is defined by the semifinished product surfaces 24a, 24b, 24c that come in contact with the sides 33a, 33b and 33c of the third tool part 33 during the insertion thereof. In order to move the third tool part 33 in the X-direction, the third tool part 33 is motionally coupled with a tool part receptacle 44 that, in turn, is coupled with the second adjusting unit 42 in the embodiment according to FIG. 4a such that the actuation of the second adjusting unit 42 causes the second tool part 32, as well as the third tool part 33, to move in the X-direction. The third tool part 33 is furthermore decoupled from the second tool part 32, particularly in the Y-direction. Consequently, the third tool part 33 moves in the second direction R2 or the X-direction when the second tool part 32 is moved in the second direction, R2. The segments HA3-22 and HB3-2 that lie on top of one another therefore are compressed during a movement of the second tool part 32 in the negative X-direction, i.e., in the direction of the lower side AA.

In order to cause the second tool part 32, as well as the third tool part 33, to move in the Y-direction when the second adjusting unit 42 is actuated, the third tool part 33 may also be directly coupled with the second adjusting unit 42 analogous to the second tool part 32.

Under the influence of a certain compressive force exerted by the tool parts 32, 33 and optionally a predetermined march of pressure in the pressing tool 13, the segments HA3-22, HB3-2 of two semifinished product arrangements HA3, HB3 that lie on top of one another are compressed into an integral or one-piece layer such that an integral or one-piece semifinished product H4 is created in the pressing tool after the compression process and exits the pressing tool.

In the embodiment of the pressing tool 13 according to FIG. 4a, a fourth tool part 34 is furthermore provided and arranged on the second side R3 of the pressing tool 13, wherein this fourth tool part can be moved relative to the other tool parts and, in particular, relative to the first tool part 31 in the first direction R1, i.e., in the Y-direction. The fourth tool part 34 may also be immoveable or form part of the first tool part 31 in the pressing tool. The fourth tool part 34 has a tool part surface 34a, the surface normal of which extends in the negative Y-direction such that this tool part surface 34a can be brought in contact with the outer surface 25a of the first cross-sectional segment HA3-1 of the upper semifinished product arrangement HA3 that is situated farthest in the direction of the second side R3. The second tool part 32 furthermore features a tool part surface 32c, the surface normal of which extends in the positive Y-direction and toward the right side R3, wherein this tool part surface can be brought in contact with the surface of the left limb HB3-3 of the U-shaped semifinished product arrangement HB3, the surface normal of which extends in a negative Y-direction.

Due to the ability to move the second tool part 32 relative to the fourth tool part 32 that acts as a counter surface and the arrangement of the third tool part 33 between the tool parts 32, 34 and between the limbs HB3-1 and HB3-3, the cross-sectional segments of the semifinished product arrangement can be compressed with tool part surfaces, the surface normals of which extend in the Y-direction.

Since the tool parts 31, 32, 33, 34 of the pressing device 13 are provided with tool part surfaces, the surface normals of which extend opposite to the surface normals of the semifinished product segments that contact and are compressed by these tool surfaces and opposite to the surface normals of the surfaces of the tool part acting as a counter surface that face the movable tool part, and since the tool parts can be moved relative to one another in the direction of this surface normal by means of the adjusting units 41, 42, it is possible to carry out a compression process with post-compression and therefore to compress the formed body of semifinished product arrangements HA3, HB3 into an integral or one-piece semifinished product of high quality. In this case, the movable tool part may be moved by means of at least one adjusting unit that makes it possible to respectively carry out a linear movement of the movable tool part in the direction of each surface normal of the surfaces of the formed body of semifinished product arrangements that face this tool part. The adjusting unit is able to move at least the tool part or the tool parts that are situated beyond the cross-sectional center line of the formed body of semifinished product arrangements referred to a counter surface and can press the cross-sectional segments to be compressed against the counter surface. It would be possible, in particular, to provide several adjusting units 51, 52 for moving the movable tool part 32, wherein each adjusting unit can carry out a linear movement in the direction of one respective surface normal of the tool part acting as counter surface.

In the application shown, the cross-sectional segments HA3-1 and HA3-21 of the formed body of semifinished product arrangements situated in the pressing tool 13 according to FIG. 2c or their center lines extend perpendicular to one another and the surface normals of these cross-sectional segments HA3-1 and HA3-21 accordingly also extend perpendicular to one another (see FIG. 2c). In order to press the at least one movable tool part 32 against the corresponding upper sides of the cross-sectional segments HA3-1 and HA3-21 that generally extend angularly to one another, as well as to additionally press the movable tool part against these cross-sectional segments HA3-1 and HA3-21, this tool part is arranged such that it can be moved in the direction of both surface normals, namely a first and a second surface normal. Since the cross-sectional segments HA3-1 and HA3-21 extend perpendicular to one another in the example shown, the tool part 32 also can be moved relative to the first tool part 31 in two directions that extend perpendicular to one another. In one embodiment of the pressing device 13, two linear adjusting units that may consist, in particular, of two lifting cylinders 41, 42 are provided for this purpose, wherein the end faces of said lifting cylinders can be respectively placed against a non-rotatable tool supporting device 40a and 40b on the one hand and against a tool part receptacle 43 and 44 on the other hand. The end faces of the linear adjusting units or lifting cylinders may also be connected to the respective tool supporting devices 40a and 40b and/or to the respective tool part receptacles 43 and 44. The tool supporting devices 40a and 40b may also be realized in the form of a one-piece tool supporting device or a tool supporting device 40 composed of interconnected parts. The lifting or adjusting cylinders may be operated, e.g., hydraulically, electrically or pneumatically.

If several adjusting units 41, 42 for compressing a semifinished product segment are realized in such a way that they can respectively move the tool part coupled therewith linearly and the tool part coupled with these adjusting units have surfaces with surface normals that extend angularly to one another, a guiding unit is coupled between each adjusting unit and the tool part moved by this adjusting unit in order to allow a movement of the tool part relative to each of these adjusting units, wherein the tool part can move relative to one respective adjusting unit in the direction of the tool part surface, the surface normal of which extends to the respective adjusting unit in the direction of the adjusting movement. This aspect of the invention is described below with reference to the exemplary embodiments illustrated in FIG. 4a.

The first tool part receptacle 43 that can be moved in the direction of the first surface normal and the movable tool part 32 from a first guiding unit 51, by means of which the movable tool. part 32 can be displaced and moved back and forward relative to the first tool part receptacle 43, namely vertically referred to the first surface normal (and vertically referred to the longitudinal direction L3) or along the surface of the semifinished product region H4-1 and therefore in the direction R2 relative to the first tool part 31. The second tool part receptacle 44 that can be moved in the direction of the second surface normal and the movable tool part 32 furthermore form a second guiding unit 52, by means of which the movable tool part 32 can be displaced or moved back and forward relative to the second tool part receptacle 44, namely vertically referred to the second surface normal (and vertically referred to the longitudinal direction L3) or along the surface of the semifinished product region H4-21 and therefore in the direction R1 relative to the first tool part 31.

Figure 4D:
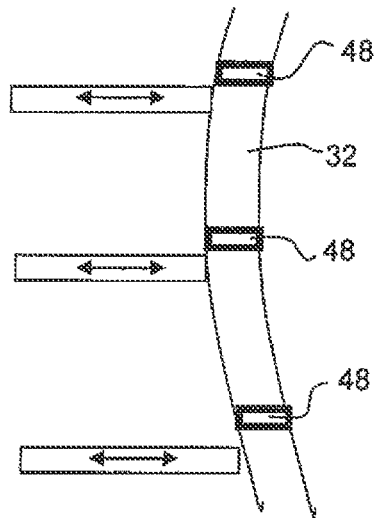
Figure 4C:
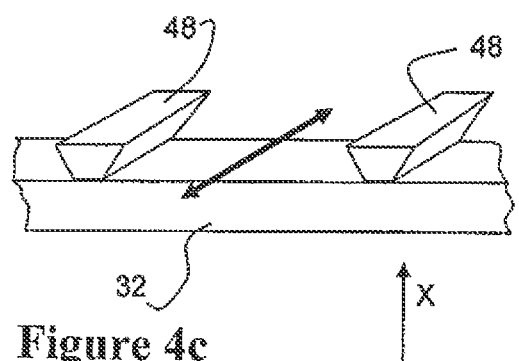
FIG. 4c shows a schematic perspective representation of a section of the movable tool part according to FIG. 2c with the guide element arranged thereon.
Figure 4E:
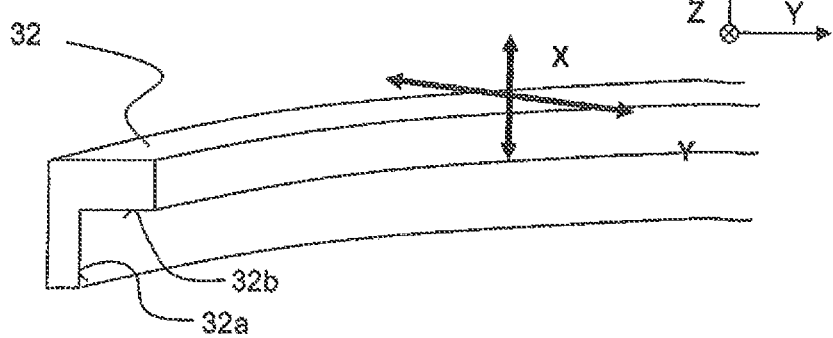
FIG. 4e shows a schematic perspective representation of a section of the movable tool part according to FIG. 2c.

The guiding units 51, 52 may be realized with a coupling in the form of a guide groove and a guide element engaging therein. In the embodiment illustrated in FIGS. 4d and 4e, the guiding units 51 and 52 are realized with one respective guide groove 45 and 46 in the first and in the second tool part receptacle 43 and 44 and with one respective guide element 47 and 48 of trapezoidal a cross section (FIG. 4d) that is arranged on the movable tool part 32, wherein the guide elements partially engage into the respective guide groove 45 and 46 with a positive fit. Several guide elements 47 and 48 are preferably arranged along the tool part 32, wherein these guide elements are successively arranged on the respective outer side of the tool part 32 referred to the longitudinal direction L3 of the pressing tool 13 and with the respective orientation (FIG. 4d). Accordingly, several guide grooves 45 and 46 for receiving the respective guide elements 47 and 48 are arranged along the tool part receptacles 43 and 44, wherein the guide grooves 45 and 46 are successively arranged on the respective side of the tool part receptacles 43 and 44 that faces the tool part 32 referred in the longitudinal direction L3 of the pressing tool 13 and with the respective orientation. The guide elements 47 and 48 and the guide grooves 45 and 46 may also have a cross-sectional shape other than that shown in the figures, wherein the guide elements 47 and 48 engage into the guide grooves 45 and 46 and thusly allow a linear displacement of the respective tool part 32 relative to the adjusting units 41, 42. The guide elements 47 and 48 may alternatively or additionally be coupled with the adjusting units 41, 42 and the guide grooves 45 and 46 may be provided on the tool part 32.

Due to the movement of the movable tool part 32 relative to at least one other tool part, namely the stationary or immovable base tool part 31 in the described exemplary embodiment, in the direction of the surface normals of the contact surfaces by means of the two adjusting units 41, 42, the semifinished product arrangements HA3, HB3 that were introduced into the pressing tool 13 and are situated between tool parts that can be moved relative to one another (FIG. 2c) are formed into a semifinished product H4 of integral cross section under the influence of a compressive force and optionally a predetermined temperature. In this case, the different layers, of the formed body G of semifinished product arrangements HA3, HB3 can be compressed into a uniform cross-sectional layer in the forming device 12. The pressing tool 13 is furthermore realized in such a way that the semifinished product arrangements HA3, HB3 lying between the tool parts are compressed when the tool parts are moved together, i.e., in a state, in which the movable tool part 32 presses against the surface of the immovable tool part 31 and therefore the semifinished product arrangements HA3, HB3 situated between the tool parts with a predetermined force, wherein the movable tool part 32 can be readjusted within certain time intervals or in dependence on the time if the material thickness of the thusly created integral semifinished product arrangement H4 is reduced due to the material compaction of the semifinished product arrangement caused by the pressure being exerted.

The pressing tool 13 and the at least one semifinished product arrangement to be compressed with this pressing tool may also be designed differently. A few variations are described in detail below:

For example, only one semifinished product arrangement that only features the cross-sectional segments HA3-1 and HA3-2 and therefore has a simple angle profile may be formed in the pressing tool 13. In this case, it suffices to provide the pressing tool 13 with a first tool part and a second tool part 32 that respectively have corresponding dimensions, wherein at least the second tool part 32 can be moved in the direction of the first tool part 31 by means of a first adjusting unit 41 and a second adjusting unit 42. The directions, in which the cross-sectional segments HA3-1 and HA3-2 extend, may also be inclined relative to one another by an angle other than 90 degrees. In this case, the adjusting directions R1 and R2 of the second tool part 32 are realized such that they extend in the direction of the surface normals of the cross-sectional segments of the angle profile.

In one variation, the pressing tool 13 may also be realized and designed for compressing and forming a U-shaped semifinished product arrangement that consists, e.g., of the upper semifinished product arrangement HB3 in FIG. 2c. In this case, the second tool part 32 may be realized without the section with the second tool part surface 32a.

For example, a semifinished product arrangement may also be realized in the form of a complete H-profile or a partial H-profile with one or more missing limbs, i.e., with at least two segments that protrude from a central segment lying on the first tool part 31 in the Y-direction. In this case, a cross-sectional recess is formed between the limbs that extend parallel to one another, wherein a tool part 33 that can be pressed [in the Y-direction] against a fourth tool part in the Y-direction by the second tool part 31 can be inserted into the aforementioned cross-sectional recess—based on the exemplary embodiment illustrated in FIG. 4e.

The arrangement according to FIG. 4a can be generally utilized, particularly in the aforementioned applications, if the segments of semifinished product arrangements extend angularly to one another as long as the adjusting arrangements are realized such that at least one tool part 32 can be additionally moved in these two angles relative to the movement of the adjusting unit.

The pressing tool 13 generally features at least two tool parts that can be moved relative to one another in order to compress the formed body of semifinished product arrangements introduced into the pressing tool 13 without changing the orientation of cross-sectional regions relative to the cross-sectional regions of semifinished product arrangements according to FIG. 2c.

In one embodiment of the invention, the pressing tool for compression-forming a formed body of semifinished product arrangements with complex structure introduced into the tool features at least a first immovable tool part and at least one tool part that can be moved relative to the immovable tool part in order to also carry out a post-compression of the formed body of semifinished product arrangements introduced into the pressing tool 13 without changing the orientation of cross-sectional regions that extend angularly to one another. In one variation of this embodiment, the at least one movable tool part features two contact surfaces that extend angularly to one another and have a first and a second surface normal that respectively extend in the direction of the first and the second surface normal of the cross-sectional regions of the formed body of semifinished product arrangements that extend angularly to one another and are compressed by the movable tool part, wherein the immovable tool part forms the counter surface. In one variation, the first tool part may also be realized such that it can be moved relative to the second tool part. In order to realize nominal thicknesses and a high quality of the component to be manufactured, the invention proposes to readjust the tool parts in order to reduce the semifinished product thicknesses produced in the first step of the compression process to nominal thicknesses of the semifinished product H4 in a second step by means of material compaction.

The adjusting unit that is driven by a drive unit makes it possible to move the tool parts from positions, in which they are spaced apart from one another, into positions, in which they are moved together, namely such that a predetermined compressive force is exerted and the semifinished product arrangements situated between these, two parts can be compressed in a predetermined fashion. This also makes it possible to realize, e.g., a discontinuous mode, in which the semifinished product arrangement H4 can be pulled through the pressing tool 13 while the tool parts are moved apart from one another and the semifinished product arrangement H4 can be compressed when the tool parts are moved together.

If a hardened semifinished product or component that is curved referred to the longitudinal direction of the semifinished product arrangement H4 should be manufactured, the pressing tool, i.e., its tool parts, preferably can be realized such that they are curved in its longitudinal direction L3.

The pressing tool is provided for exerting a compressive force in order to compress the introduced semifinished product under the optional influence of a predetermined temperature or a predetermined march of temperature.

The pressing device makes it possible to manufacture FRP-components with an angled cross-sectional shape and, in particular, frames of an aircraft fuselage.

Figure 5A:
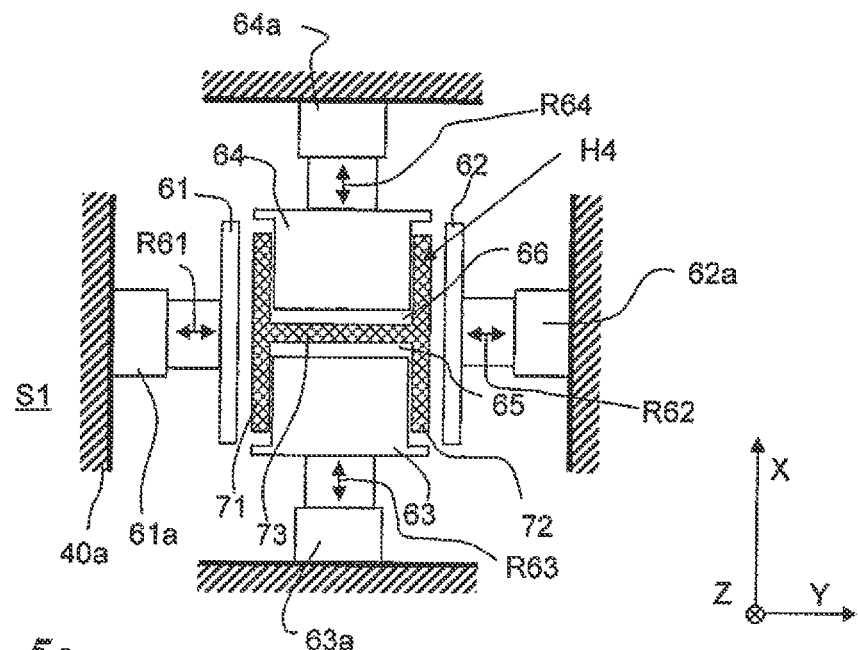
FIG. 5a shows a schematic representation of another embodiment of a pressing tool in a first position.
Figure 5B:
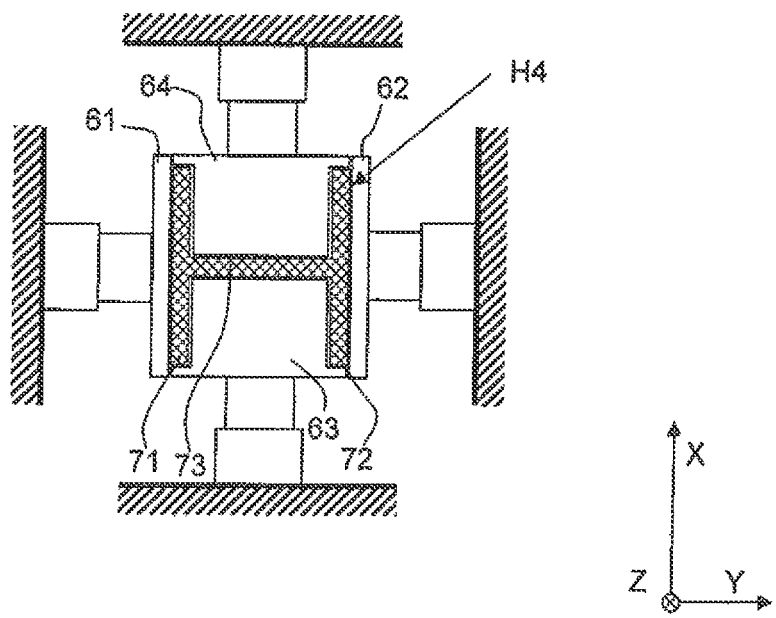
FIG. 5b shows the embodiment of the pressing tool according to FIG. 5a in a second position, in which the tool parts compress the semifinished product arrangement situated between these tool parts.

In another exemplary embodiment according to FIGS. 5a, 5b, the pressing tool 13 may be realized with tool parts, two of which can be respectively moved in directions that extend opposite to one another. FIGS. 5a and 5b show an exemplary embodiment with four tool parts 61, 62, 63, 64, wherein the tool parts 61 and 62 and the tool parts 63 and 64 can be respectively moved opposite to one another.

This arrangement makes it possible, in particular, to compress an H-profile with two longitudinal flanges 71, 72 that extend parallel to one another and a central segment or a web 73 that connects the two longitudinal flanges [text missing] that consequently form two opposite recesses 65, 66 between surfaces that respectively face one another. For this purpose, a first and a second tool part 61, 62 respectively can be linearly moved opposite to one another in the directions R61 and R62, as well as perpendicular to the longitudinal direction of the cross-sectional segments 71, 72 of the longitudinal flanges and to the longitudinal direction L3 of the pressing tool, by means of adjusting unit 61*a* and 62*a*. A third and a fourth tool part 63 and 64 can be linearly moved relative to one another in the directions R63 and R64 that extend perpendicular to the moving directions of the first and the second tool part 61, 62 in a cross-sectional view (FIGS. 5*a*, 5*b*) by means of adjusting unit 63*a* and 64*a*, wherein the third and the fourth tool part can be inserted into the recesses 65, 66 and moved on both sides of the web along the cross-sectional segments 71, 72 of the longitudinal flanges extending from this web.

The pressing tool may generally feature a heating unit. In this case, a temperature sensor with a temperature monitoring device is preferably provided. Due to the control of the process temperatures, it is possible, in particular, to optimize the quality of the semifinished product or component to be manufactured. This also makes it possible to carry out reproducible test runs by means of purposeful temperature monitoring.

The pultrusion system or pultrusion device P may be provided with a control unit that can specify nominal temperatures and features a control device and a corresponding actuation of the heating units, by means of which the nominal temperatures of the heating units can be specified and controlled.

The pultrusion system P features a drawgear 15 for feeding the semifinished product arrangement into the forming device 12, wherein said drawgear realizes the feed movement V of the semifinished product arrangement by means of clamping jaws.

The invention claimed is:

1. A pultrusion method for manufacturing at least one of a profiled preform and a fiber-reinforced plastic (FRP) with cross-sectional segments that extend angularly to one another in a quasi-continuous process, comprising:
   dispensing at least two semifinished reinforcement fiber layers and at least one resin film therebetween from respective dispenser rolls of a dispenser unit to form at least one multilayer semifinished product arrangement;
   drawing the semifinished product arrangement into a forming device using a pulling device downstream of the forming device;
   angling at least one cross-sectional segment of the semifinished product arrangement by guiding the semifinished product arrangement through the forming device such that the cross-sectional segments of the semifinished product arrangement form an angle profile;
   compressing the semifinished product arrangement into the cross-sectional shape, in which the semifinished product arrangement exits the forming device, in a pressing device by moving together movable tool parts and subsequently moving the tool parts apart from one another, wherein a feed movement of the semifinished product arrangement takes place while the tool parts are moved apart from one another;
   heating and compressing the semifinished product arrangement in the pressing device such that partial cross-linking only of a resin of the resin film takes place and the cross-sectional segments of the semifinished product arrangement are fixed relative to one another in a shape-preserving fashion, as well as a compaction of the cross-sectional segments, and wherein the drawing movement of the semifinished product arrangement is interrupted during the compression process;
   subsequently hardening the semifinished product arrangement in a tempering furnace to further cure the resin of the resin film to obtain a hardened semifinished product arrangement; and
   cutting a longitudinal section off the semifinished product arrangement with the bonded fiber layers and removing this longitudinal section as at least one of the profiled preform and the fiber-reinforced plastic (FRP),
   wherein the semifinished reinforcement fiber layers are sewn together prior to being angled and the resin of the resin film is provided in a proportion of no more than 15% of a total weight of the multilayer semifinished product arrangement.

2. The pultrusion method according to claim 1, wherein the semifinished reinforcement fiber layers of the multilayer semifinished product arrangement that are drawn into the forming device are not impregnated with any resin material.

3. The pultrusion method according to claim 1, wherein the semifinished reinforcement fiber layers are at least partially composed of bonded fabrics of reinforcement fibers.

4. The pultrusion method according to claim 1, wherein the semifinished product arrangement includes a layer of nonwoven fabric as binder material.

5. The pultrusion method according to claim 1, further comprising applying a resin binder material onto at least one semifinished reinforcement fiber layer in the form of powdery material before the semifinished product arrangement is fed into the forming device.

6. The pultrusion method according to claim 1, further comprising moving the tool parts into a first pressing position and holding the tool parts in such pressing position for a predetermined time in a first step during the compression in the pressing device, and
   moving the tool parts relative to one another into a second pressing position, in which at least two tool parts are moved closer together than in the first pressing position, in a second step in order to carry out a subsequent post-compression of the pre-compressed semifinished product arrangement.

7. The pultrusion method according to claim 1, further comprising:
   placing reinforcement layers of prepreg locally onto the profiled preform, and subsequently curing the combination of the profiled preform and the semifinished reinforcement fiber layers.

8. The pultrusion method according to claim 1, further comprising:
   placing reinforcement layers of dry fabrics locally onto the profiled preform with a resin film therebetween, and
   subsequently curing the combination of the profiled preform with the reinforcement layers and the resin film.

9. The pultrusion method according to claim 1, wherein the pulling device is arranged downstream of the tempering furnace.

10. The pultrusion method according to claim 1, further comprising:
    supplying resin to the profiled preform after cutting thereof in a resin infusion process, and
    subsequently curing the profiled preform.

11. The pultrusion method according to claim 1, further comprising placing a separating foil onto at least one of top and bottom surfaces of the arrangement of semifinished reinforcement fiber layers before the semifinished product arrangement is fed into the forming device.

12. The pultrusion method according to claim 11, further comprising:
    winding up the resin film and a separating foil on a roll in the form of layers that lie on top of one another, and
    jointly unwinding the resin film and the separating foil from the roll in order to combine the resin film with the semifinished reinforcement fiber layer to thusly form the arrangement of semifinished reinforcement fiber layers.

13. The pultrusion method according to claim 12, wherein at least one dry bonded fabric or fabric is provided with a binder in order to fix the individual bonded fabrics.

14. The pultrusion method according to claim 12, further comprising continuously changing the position of at least one cross-sectional segment of the semifinished product arrangement to a nominal angular position while the semifinished product arrangement fed to the forming device is guided through the forming device by means of transport rollers that contact the semifinished product arrangement and the transport rollers are arranged in the longitudinal direction of the forming device such that the position of the semifinished product arrangement changes from a position in the entry region to a position in the outlet region of the forming device.

15. The pultrusion method according to claim 11, further comprising dispensing an arrangement including the semifinished reinforcement fiber layer, the resin film and the separating foil made available by the dispenser unit from a dispenser roll.

16. The pultrusion method according to claim 11, further comprising dispensing the semifinished reinforcement fiber layer from a first dispenser roll and dispensing the resin film with the separating foil from a second dispenser roll such that the dispenser unit provides the arrangement of semifinished reinforcement fiber layers, the resin film and the separating foil.

17. The pultrusion method according to claim 11, further comprising dispensing the semifinished reinforcement fiber layer from a first dispenser roll, dispensing the resin film from a second dispenser roll, and dispensing the separating foil from a third dispenser roll such that the dispenser unit provides the arrangement of semifinished reinforcement fiber layers, the resin film and the separating foil.

18. The pultrusion method according to claim 1, wherein the arrangement of semifinished products made available by the dispenser unit is composed of several semifinished reinforcement fiber layers and several resin films, wherein a bottom layer includes a resin film and a top layer consists of a layer of dry bonded fabric or fabric.

19. The pultrusion method according to claim 1, wherein the arrangement of semifinished products fed to the dispenser unit is composed of at least two semifinished reinforcement fiber layers and at least two resin films, wherein a top layer and a bottom layer of the arrangement of semifinished products, respectively, includes a dry bonded fabric or fabric.

20. The pultrusion method according to claim 19, further comprising respectively dispensing the at least two dry bonded fabrics or fabrics and the at least one resin film from a dispenser roll in the dispenser unit.

21. The pultrusion method according to claim 1, further comprising continuously changing the position of at least one cross-sectional segment of the semifinished product arrangement to a nominal angular position while the semifinished product arrangement fed to the forming device is guided through the forming device by means of a forming channel with forming contours that contact the semifinished product arrangement.

22. The pultrusion method according to claim 1, wherein the forming device includes contour surfaces that are realized in such a way that the semifinished product arrangement is curved in its longitudinal direction while it is guided through the forming device.

* * * * *